United States Patent [19]
Arnott et al.

[11] 3,954,324
[45] May 4, 1976

[54] PAVEMENT MARKER HAVING CONICAL RETRO-REFLECTORS

[75] Inventors: Robin A. Arnott; John F. Domaracki, both of Windsor, Canada

[73] Assignee: International Tools (1973) Limited, Windsor, Canada

[22] Filed: Oct. 22, 1974

[21] Appl. No.: 516,930

[52] U.S. Cl. .................................. 350/109; 350/97; 350/104; 350/102; 350/106
[51] Int. Cl.² .................................. G02B 5/136
[58] Field of Search ........... 350/109, 103, 104, 106, 350/97; 404/14

[56] References Cited
UNITED STATES PATENTS

| | | | |
|---|---|---|---|
| 1,643,420 | 1/1925 | Porter | 350/293 |
| 1,675,431 | 7/1928 | Shapp | 350/109 |
| 1,743,835 | 7/1923 | Stimson | 350/103 |
| 2,181,725 | 12/1936 | Eckel | 350/109 |
| 3,627,403 | 12/1971 | Hedgewick | 404/14 |
| 3,873,184 | 3/1975 | Heenan | 350/109 |

*Primary Examiner*—John K. Corbin
*Assistant Examiner*—Ben Wm. de los Reyes
*Attorney, Agent, or Firm*—Reising, Ethington, Barnard, Perry & Brooks

[57] ABSTRACT

A pavement marker including a housing having a base for engagement with the surface of a roadway and a reflective wall for reflecting light from vehicles on the roadway when the fore-and-aft axis of the housing is disposed in parallel relationship with the direction of travel of vehicles on the roadway. The central portion of the reflective wall is formed with a plurality of conical reflector elements having relatively high optical efficiency for reflecting incident light rays on the outer surface of the reflective wall that are substantially in a horizontal plane parallel to the plane of the base and that are substantially parallel to the fore-and-aft axis of the housing, but having relatively low optical efficiency for reflecting light rays making a substantial acute angle with respect to the plane of the base or the fore-and-aft axis of the housing. Wide angle reflector elements are formed on side portions of the reflective wall projecting from opposite ends of the central portion. The wide angle reflector elements are of a configuration other than conical and have less optical efficiency than the conical reflector elements for reflecting incident light rays on the outer surface of the reflective wall that are substantially in a horizontal plane parallel to the plane of the base and that are substantially parallel to the fore-and-aft axis, but have greater optical efficiency than the conical reflector elements for reflecting incident light rays that make a substantial acute angle with the plane of the base or the fore-and-aft axis of the housing. The conical reflector elements each have an apex located remotely from the outer face of the reflective wall and an axis passing through the apex and lying in a plane that is perpendicular to the plane of the base and parallel to the fore-and-aft axis of the housing, the axis of each of the conical reflector elements extending at an acute angle with respect to the normal to the outer face such that the conical reflector elements are oriented to receive incident light refracted from the outer face and reflect the light in a direction substantially parallel to the direction of incidence. The wide angle reflector elements are of the cube corner type in the preferred embodiment. In a modified embodiment, the wide angle reflector elements are of spherical configuration, the spherical reflector elements providing good wide angle performance but having lower optical efficiency than the cube corner reflector elements.

15 Claims, 13 Drawing Figures

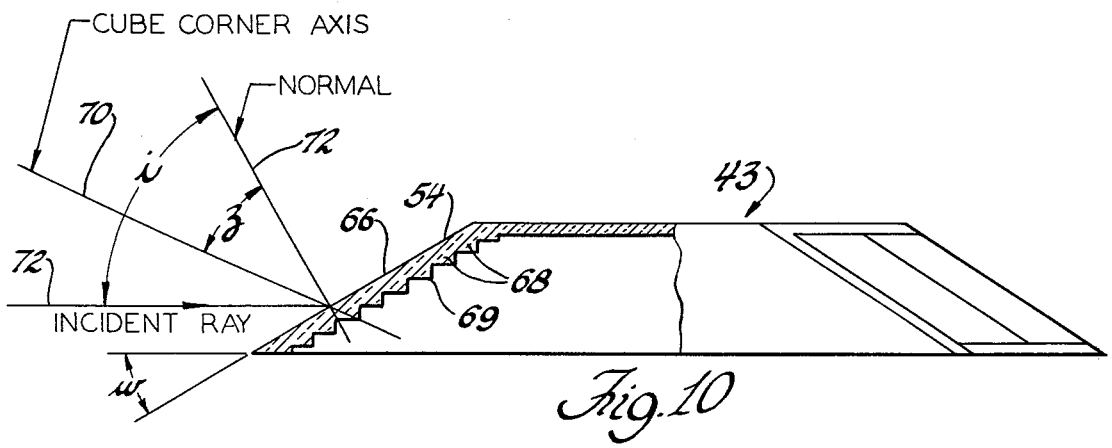
*Fig. 10*
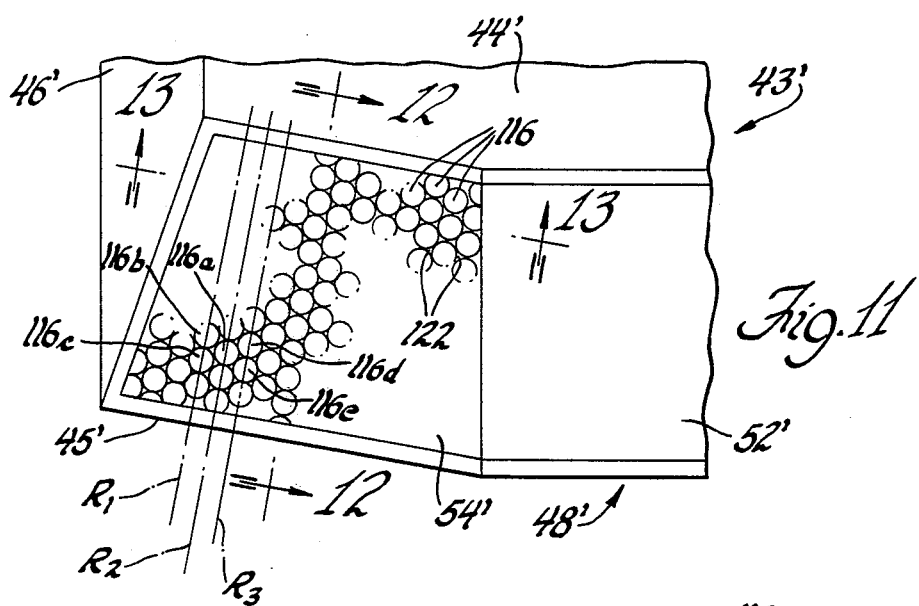
*Fig. 11*
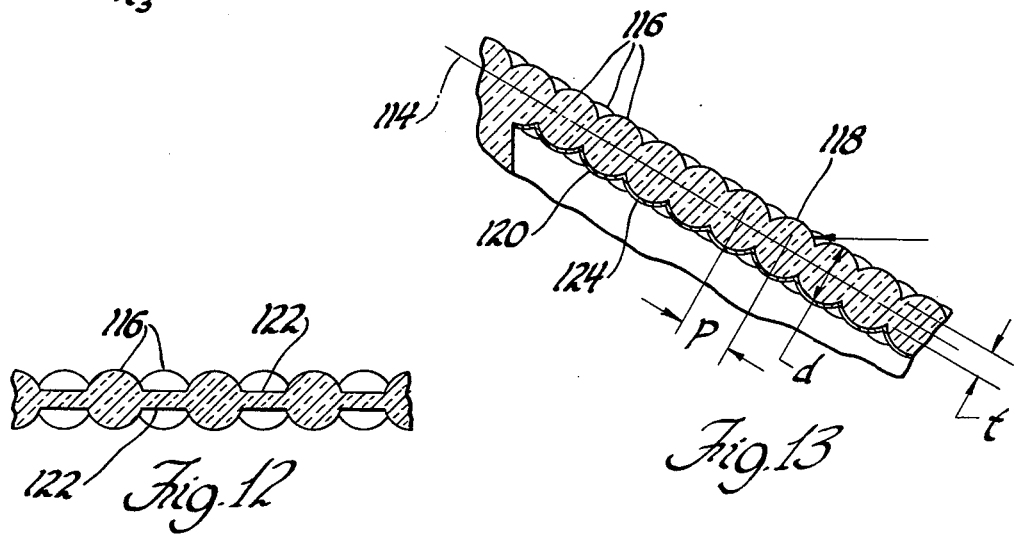
*Fig. 12*
*Fig. 13*

PAVEMENT MARKER HAVING CONICAL RETRO-REFLECTORS

BACKGROUND OF THE INVENTION

1. Field of the Invention

This invention relates generally to pavement markers, and is particularly concerned with pavement markers utilizing retro-directive reflecting elements for relfecting light from vehicles traveling over the roadway on which the pavement marker is mounted.

2. Description of the Prior Art

Roadway or pavement markers using reflectors having retro-directive reflector elements have come into widespread use to delineate traffic lanes and the edges of roadways. Such roadway markers are superior to painted strips on the roadways since under poor weather conditions, painted strips on the roadways are not visible.

The most common type of reflector utilized in such roadway markers are those formed with cube corner reflex reflector elements. Cube corner reflector elements have three planar surfaces arranged mutually at right angles with respect to each other, the three surfaces meeting at a common point or apex which is remote from the incident, light receiving surface of the reflector on which the reflector elements are formed. Light rays striking the incident, light receiving surface of the reflector are first refracted by the material of the reflector, and are then reflected by the cube corner reflector elements toward the source of the incident light rays. Before being reflected by the cube corner elements, the refracted incident light ray strikes each of the three cube corner surfaces, in almost every case, before the refracted light ray is reflected back toward the source. The three reflections on the cube corner surfaces increases the length of the light path in the material of the reflector, which, in turn causes more absorption of the light to reduce the amount of light reflected.

Examples of prior art pavement markers are reflectors are disclosed in U.S. Pat. Nos. 835,648; 2,172,660; 1,675,431; 2,330,096; 3,332,327; 3,541,606 and 3,784,279.

SUMMARY OF THE INVENTION

An object of this invention is to provide a pavement marker having a reflective portion that reflects light, at least in one direction, at a greater power than reflective members formed solely with cube corner reflector elements.

A further object is to provide a pavement marker that reflects light striking the reflective wall of the pavement marker in a horizontal and vertical plane with greater power than is possible with reflective portions having cube corner reflector elements, and which at the same time, is capable of reflecting light striking the reflective portion of the pavement marker from either side of the vertical plane extending along the fore-and-aft axis of the pavement marker.

In carrying out the foregoing, and other objects, a pavement marker according to the present invention includes a housing with a base for engagement with the surface of a roadway. The housing includes a reflective wall for reflecting light from vehicles on the roadway. The reflective wall has a central portion which extends transversely of the fore-and-aft axis of the housing. The reflective wall is of light transmitting synthetic resin, and the inner surface of the central portion is formed with conical reflector elements having relatively high optical efficiency, or reflective power, for reflecting incident light rays that are generally parallel to the fore-and-aft axis and that are substantially in a horizontal plane parallel to the plane of the base. The conical reflector elements, however, have relatively low optical efficiency, or reflective power, for reflecting incident light rays making an acute angle of more than approximately 7° with respect to the plane of the base or the fore-and-aft axis of the housing. The apex of each of the cones is located remote from the incident, light receiving surface of the reflective wall. The conical reflector elements reflect light after only two reflections to shorten the path of the light reflected by the cones. The central portion of the reflective wall has an outer surface that extends at an acute angle with respect to the plane of the base, and the axis of each of the conical reflector elements lies in a plane that is perpendicular to the plane of the base and is parallel to the fore-and-aft axis of the housing. The axis of each cone further extends at an acute angle with respect to the normal to the outer face corresponding to the angle of refraction of the reflective wall such that incident light rays on the outer face that are generally horizontal and parallel to the fore-and-aft axis will be reflected by the central reflector elements in a direction parallel to the incident light rays.

The reflective wall is further formed with a pair of side portions extending from opposite ends of the central portion. Wide angle reflecting means is provided on the side portions for reflecting light rays that extend at an acute angle with respect to the fore-and-aft axis of the housing. In one embodiment, the wide angle reflecting means comprises cube corner reflector elements. The cube corner reflector elements have less optical efficiency, or reflective power, than the conical reflector elements for reflecting light rays in a horizontal plane and parallel to the fore-and-aft axis, but have greater optical efficiency than the conical reflector elements for reflecting light rays that make an acute angle of approximately 7° or more with respect to the horizontal plane or the fore-and-aft axis.

In another embodiment, the side reflecting means is in the form of spherical reflector elements. The spherical reflector elements have less optical efficiency than the cube corner reflector elements, but have substantially uniform reflective power at all angles with respect to their centers.

In both embodiments, the conical reflector elements of the central portion of the reflective wall provide high powered reflecting means for light rays parallel to the fore-and-aft axis of the housing in a horizontal and vertical plane, while the side reflecting means reflects light striking the reflective wall at an acute angle with respect to vertical planes parallel to the fore-and-aft axis of the housing.

Other objects, advantages and features of the invention will become apparent from the following description taken in connection with the accompanying drawings.

BRIEF DESCRIPTION OF THE DRAWINGS

FIG. 10 is a partial sectional view as viewed approximately along lines 10—10 of FIG. 7.

FIG. 11 is a fragmentary top plan view of a modified form of the invention;

FIG. 12 is a sectional view taken on lines 12—12 of FIG. 11; and

FIG. 13 is a sectional view taken on lines 13—13 of FIG. 11.

DETAILED DESCRIPTION OF THE PREFERRED EMBODIMENTS

Figure 1:
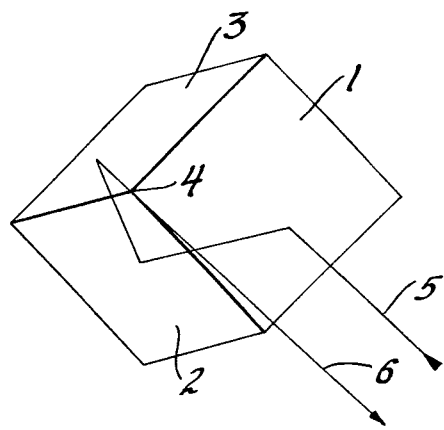
FIG. 1 is a diagrammatic view of a cube corner reflector element illustrating the path of light reflected by the cube corner.

Retro-directive reflecting elements have been devised to reflect incident light rays back toward the source in a parallel direction with a minimum loss of candle power. The most commonly used retro-directive reflector element is the cube corner type in which three surfaces are arranged perpendicular with respect to each other and meet at a common point, or apex. FIG. 1 diagrammatically illustrates a cube corner reflector having surfaces 1, 2 and 3 disposed at right angles with respect to each other and meeting at a common point or apex 4. Such reflector elements are commonly formed in light transmitting plastic, or synthetic resin, such as acrylics and polycarbonates. Reference numeral 5 indicates an incident light ray and reference numeral 6 indicates a reflected light ray, the incident ray 5 first striking each of the three surfaces 1, 2 and 3 before it is reflected along line 6. Thus, with a cube corner reflector element, three reflections are required to reflect the incident light ray 5 along the line 6. Some light is absorbed with each reflection, and light is also absorbed as the path of the light increases in length through the plastic medium.

Figure 2:
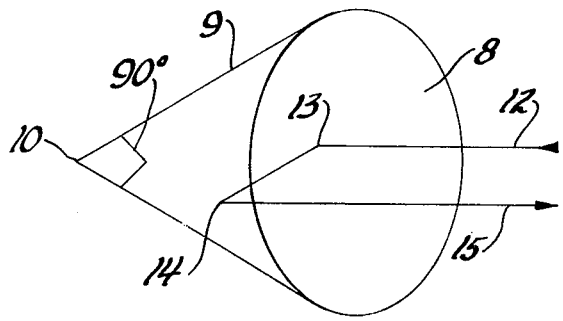
FIG. 2 is a diagrammatic perspective view of a conical reflector element illustrating the path of light reflected thereby.
Figure 3:
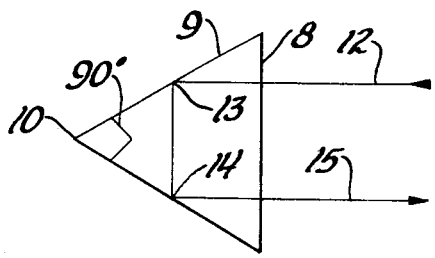
FIG. 3 is a diagrammatic elevational view of the conical reflector element of FIG. 2.

FIGS. 2 and 3 illustrate the path of light in a conical reflector element, assuming the same plastic medium as in the case with the cube corner reflector element of FIG. 1. The conical reflector element in FIGS. 2 and 3 has a front face 8, a conical side wall 9 and an apex 10. The cones are right angle cones in FIGS. 2 and 3. An incident light ray 12 is reflected at two points, 13 and 14, on the side wall 9 and returns as a reflected light ray 15. In addition to there being only two reflections, as compared with three in the case of the cube corner reflector element of FIG. 1, the length of the path of the light traveling through the plastic medium of the reflector elements of FIGS. 2 and 3 is less than the length of the path of light traveling through the cube corner reflector element. Consequently, the reflected light ray 15 of FIGS. 2 and 3 has greater candle power with respect to its incident light ray 12 than does the reflected light ray 6 with respect to its incident light ray 5 in the FIG. 1 cube corner reflector element.

Figure 4:
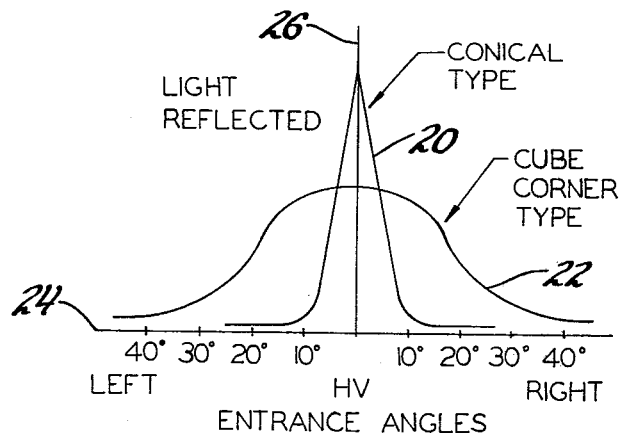
FIG. 4 is a graph comparing the optical efficiency, or reflecting power, at various entrance angles with respect to a horizontal and vertical axis, of cube corner reflector elements of the type shown in FIG. 1 with conical reflector elements of the type shown in FIGS. 2 and 3.

In FIGS. 2 and 3, the incident light ray 12 strikes the front face 8 of the reflector element in a horizontal and vertical plane. The conical reflecting reflector element of FIGS. 2 and 3 has high reflecting power when the incident light ray 12 strikes the front face 8 at a right angle, or at a small angle with respect to the horizontal and vertical planes. However, for greater entrance angles, the reflecting power of the conical reflector elements falls off rapidly as compared with the cube corner reflector element. The relationship between the entrance angle and the reflective power is illustrated in the graph of FIG. 4 wherein the curve 20 represents the reflecting power, at various entrance angles, of a conical reflector element of the type shown in FIGS. 2 and 3, while the curve 22 represents the reflecting power of a cube corner reflector element of the type shown in FIG. 1. The entrance angles are indicated along the horizontal line 24 of the graph, while the reflecting power is indicated on the vertical line 26 of the graph and increases along the length of line 26 from zero at the intersection of lines 24 and 26. The vertical line 26 also intersects the horizontal line 24 at the zero entrance angle, which is indicated at HV to indicate that the light ray is in a horizontal and vertical plane at a right angle to the front face of the reflector at the zero entrance angle. The curves 20 and 22 illustrate that the reflecting power of the conical reflector element of FIGS. 2 and 3 is substantially greater than the reflecting power of a cube corner reflector element when the entrance angle is approximately five to seven degrees or less on either side of the HV axis, but that the cube corner reflector element has greater reflecting power at entrance angles greater than approximately 5° to 7° on either side of the HV axis.

Figure 5:
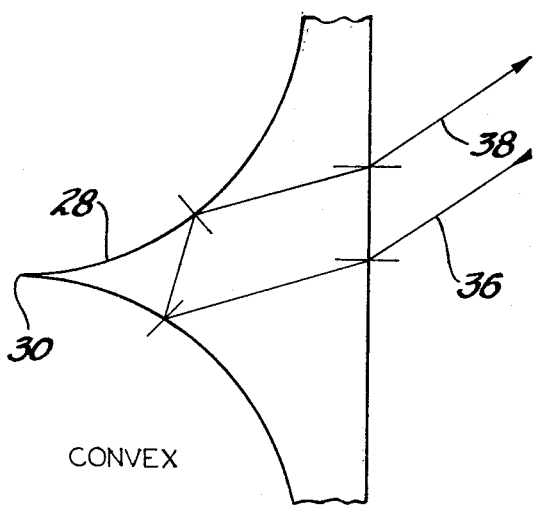
FIG. 5 is an enlarged, sectional view of a conical reflector element having a side wall that is convex with respect to refracted light rays.
Figure 6:
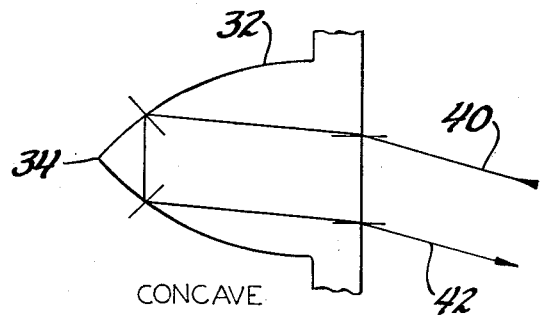
FIG. 6 is a view similar to FIG. 5 of a conical reflector element having a side wall that is concave with respect to refracted light rays.

FIGS. 5 and 6 illustrate conical reflecting elements having convex and concave sides, respectively, for increasing the reflective power of the cones at greater entrance angles than illustrated in FIG. 4. The conical reflector element in FIG. 5 has an internally convex side 28 extending from an apex 30, while the conical reflector element in FIG. 6 has an internally concave side 32 and an apex 34. Incident and reflected light rays are indicated in FIG. 5 by reference numerals 36 and 38, respectively. Incident and reflected light rays are illustrated in FIG. 6 by reference numerals 40 and 42, respectively. However, in either case of conical reflector elements, the reflecting power along the HV axis of FIG. 4 will be greater than that of a cube corner reflector, but will decrease rapidly as the entrance angle increases in any direction from the HV axis.

Figure 7:
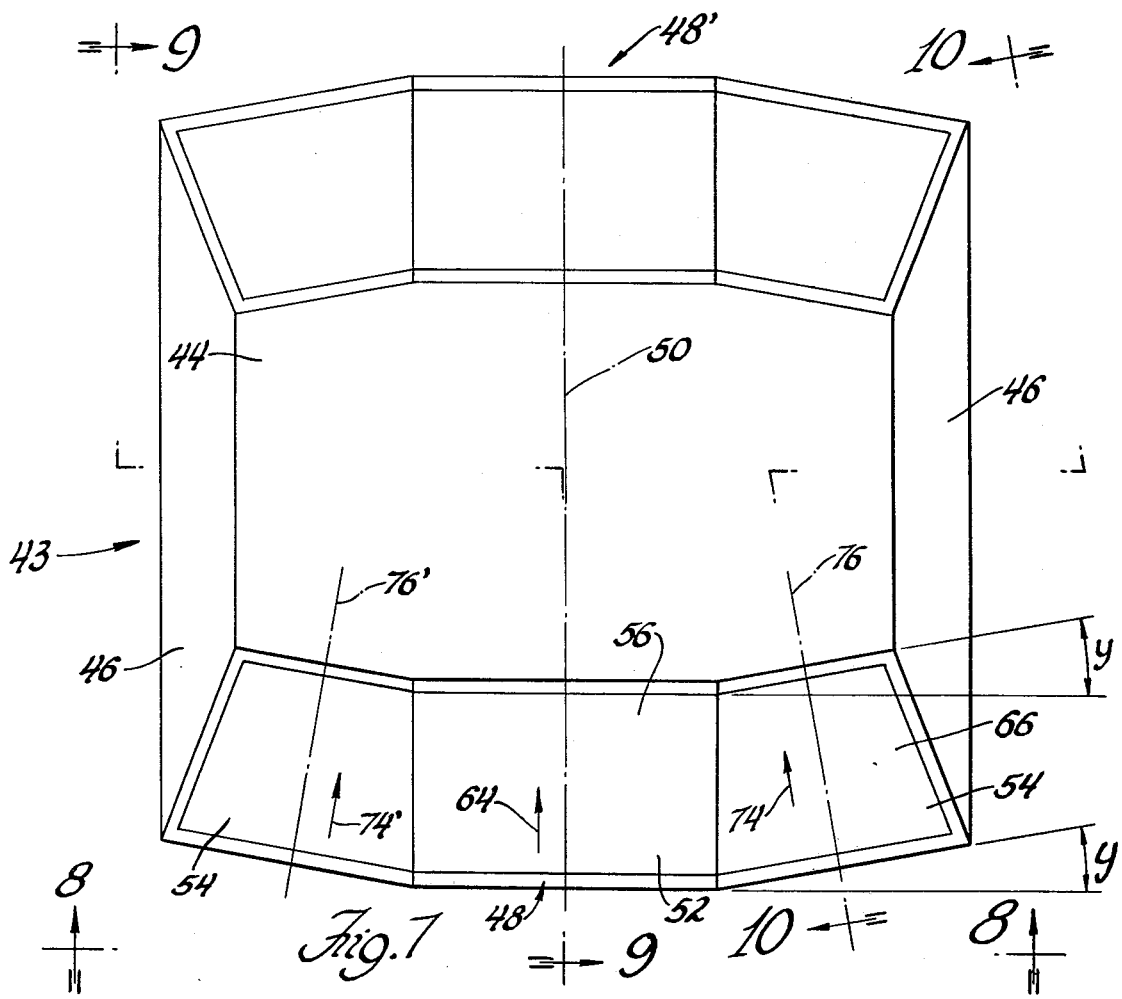
FIG. 7 is a top plan view of a pavement marker embodying the present invention.
Figure 8:
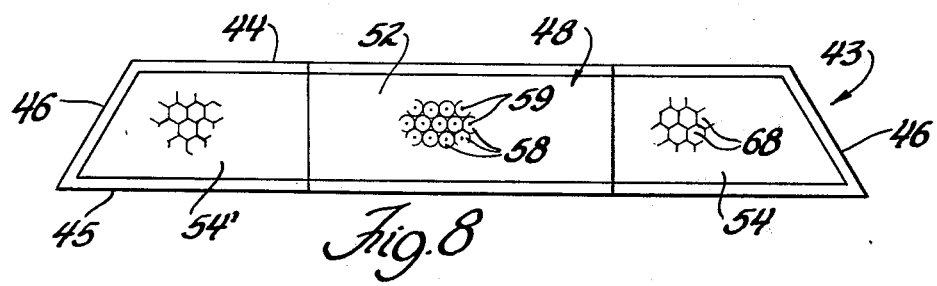
FIG. 8 is a front view of the pavement marker of FIG. 7 as viewed along lines 8—8 of FIG. 7.

In FIGS. 7 and 8, reference numeral 43 collectively designates a roadway marker housing having a top wall 44, a base 45 which may be secured adhesively or otherwise to the surface of a roadway, side walls 46, and reflective walls indicated collectively by reference numerals 48 and 48'. The reflective walls 48 and 48' extend transversely of the fore-and-aft axis 50 of the housing (FIG. 7). Axis 50 is disposed in parallel relationship with the direction of travel of vehicles on the roadway and intersects the reflective wall 48 at a right angle.

The illustrated embodiment in FIGS. 7 and 8 includes identical reflective walls 48 and 48' at opposite ends of the housing for reflecting light in both directions, such as would be required in the case where the roadway marker divides traffic lanes for traffic moving in opposite directions. In cases where the roadway marker is used to delineate a traffic lane for one-way traffic, one reflective wall can be omitted, and the reflective wall 48 only will therefore be described in detail.

The reflective wall 48 includes a transverse central portion 52 for reflecting incident light rays generally parallel to the fore-and-aft axis 50, and a pair of side portions 54 extend from opposite ends of the central portion on the right and lefthand sides of axis 50.

Figure 9:
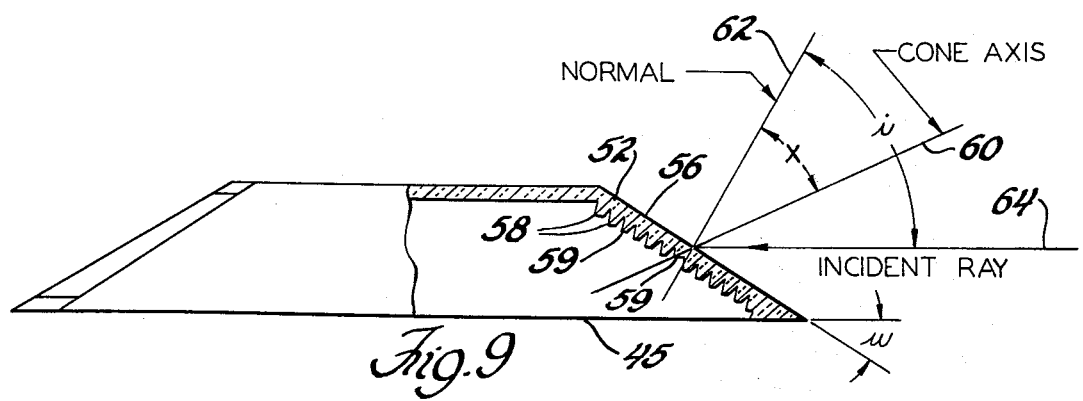
FIG. 9 is a partial sectional view taken approximately on lines 9—9 of FIG. 7.

With reference to FIG. 9, the central portion 52 has an outer surface 56 which extends at an acute angle $w$ with respect to the plane of the base 45. The central portion 52 further has an inner surface formed with a plurality of central reflector elements 58 of conical configuration, each having an apex 59. The axis 60 of each cone 58 extends through the apex 59 and lies in a plane that is perpendicular to the plane of the base 45 and is parallel to the fore-and-aft axis 50 of the housing 43. The axis 60 of each cone also makes an acute angle $x$ with respect to the normal 62 to the outer face 56. The angle $x$ between the normal 62 and the axis 60 of the conical reflector elements 58 is such that the reflector elements are oriented to return the incident light 64 generally parallel to the direction of incidence after refraction of the reflected light at the outer face.

Light from vehicles on the roadway will strike the outer face 56 in a substantially horizontal path. The vehicle light rays striking the central portion 52 can be assumed to vary only slightly, if at all, from the horizontal, within the zone that the central portion 52 is required to be visible to delineate the traffic lane. Since the outer face 56 is disposed at an acute angle $w$ with respect to the roadway surface (as defined in FIG. 9 by the plane of the base 45) the vehicle light, as represented by the incident light ray 64, will strike the outer face 56 at an angle of incidence $i$ with the normal 62 to face 56, which angle of incidence is complementary to angle $w$. The incident light ray 64 will then be refracted as it passes into the material of the reflective wall central portion 52, at an angle of refraction determined by the optical properties of the material. The axis 60 of each of the conical reflector elements 58 through the apex 59 of the cone is thus disposed at an angle $x$ with respect to the normal 62 to the outer face 56 that is the same as the angle of refraction of the reflective wall portion 52; hence, the light reflected by the conical reflector elements will be parallel to the incident light. The conical reflector elements 58 of the central portion 48 will therefore reflect incident light striking the outer face 56 in a horizontal and vertical plane with high reflective power.

With reference to FIGS. 7 and 10, each side portion 54 has an outer surface 66 also extending at an acute angle $w$ with respect to the plane of the base 45. The outer face 66 of the side portion 54 further extends rearwardly at an acute angle $y$ (FIG. 7) with respect to the outer surface 56 of the central portion 52.

As a vehicle approaches and passes the pavement marker, on the righthand side thereof as viewed in FIG. 7, the direction of the path of light from the vehicle with respect to the reflective wall 48 (and hence the entrance angle of the light) will change from the direction indicated by arrow 64 to the direction indicated by arrow 74. The direction of arrow 74 is at an acute angle with respect to the fore-and-aft axis 50 having the same magnitude as angle $y$, which magnitude is such that the reflective power of the conical reflector elements 58 is low, or is on that portion of curve 20 in FIG. 4 located between curve 22 and the horizontal line 24.

The side portions 54 each have an inner surface with side reflective means formed thereon, the side reflective means in FIGS. 7 and 10 being in the form of cube corner reflector elements 68, the apex of the cube corners being indicated by reference numeral 69. Each cube corner axis of the cube corner reflector elements 68 extends through the apex 69 and lies in a plane that is perpendicular to the plane of the base 45 and to the plane of the outer surface 66 of the respective side portion, and is thus parallel to the axis 76 in FIG. 7. The cube corner axis 70 of each of the reflector elements 68 also extends at an acute angle $z$ with respect to the normal 72 to the outer surface 66. An incident light ray 74 striking the outer surface 66 will be refracted downwardly as it passes the outer surface into the material of the reflective wall side portion 54, at an angle of refraction determined by the index of refraction of the material. The axis 70 of each of the cube corner reflector elements 68 through the apex 69 thereof if thus disposed at an angle $z$ with respect to the normal 72 to the outer surface 66 that is the same as the angle of refraction of the reflective wall portion 54, and the light reflected by the side cube corner reflectors will be parallel to the incident light. The pavement marker 43 will thus remain visible to the driver of a vehicle from the side as the vehicle approaches the position of the pavement marker before moving past the pavement marker.

In the case of a vehicle approaching the reflective wall 48 on the left side of the pavement marker, the direction of the incident light is indicated by arrow 74'.

Thus, while the central reflector elements 58 will provide high powered, long distance reflectivity for incident light in the direction of the arrows 64 in FIG. 7, the side reflector elements 68 provide reflectivity having efficiency for a wide degree of entrance angles with respect to the axis 50 as indicated by curve 22 of the graph of FIG. 4.

By way of example only, in the illustrated embodiment, angle $w$ is approximately 30°, angle $y$ is approximately 10°, and angle $i$ is approximately 60°.

The inner, light reflecting surface of the reflective wall 48, including both the conical reflector elements 58 and the cube corner reflector elements 68, may be coated with light reflective material such as by vacuum metalizing the surface with aluminum or the like in a manner well known in the art.

FIG. 11 illustrates a modified form of the invention wherein the side reflective means comprises spherical reflector elements. FIG. 11 illustrates a fragmentary portion of a roadway marker housing 43' having a top wall 44', a base 45', side walls 46' and a reflective wall 48'. The reflective wall 48' includes a central portion 52' and side portions 54' (only one side portion 54' being shown in FIG. 11). Except for the side portion 54', the central portion 52' and housing 43' are of identical construction to the central portion 52 and housing 43 of the previously described embodiment.

The side portion 54' of the reflective wall has a central plane 114 (FIG. 12) extending at an acute angle with respect to the base 45', and is integrally formed with a plurality of spherical reflector elements 116 arranged in side by side relationship. The spherical reflector elements 116 each has its center located on the central plane 114, and the portions of the spherical reflector elements projecting from the righthand side of the central plane, as viewed in FIG. 12, define an outer, light receiving surface 118 of the reflective wall, while the portions of the spherical reflector elements projecting from the lefthand side of the central plane 114 define an inner, light reflecting surface 120 of the reflective wall.

The spherical reflector elements 116 are arranged in adjacent rows extending between the top wall 44' and base 45' in which the spherical reflector elements are staggered. In FIG. 11, the centers of three rows are indicated by phantom lines designated by reference characters R1, R2 and R3. The spherical reflector elements in each row are staggered with respect to the spherical reflector elements in any adjacent row such that the center of each reflector element 116 in one row is located midway between the centers of the adjacent pairs of reflector elements in adjacent rows. Thus, with reference to FIG. 11, the center of the reflector element 116a in row R2 is located midway between the centers of the adjacent pairs of reflector elements 116b and 116c of row R1, as well as between the centers of the adjacent pairs of reflector elements 116d and 116e in the adjacent row R3.

Each of the spherical reflector elements 116 has the same diameter indicated at $d$ in FIG. 12. The centers of adjacent pairs of reflector elements 116 are separated a distance $p$ (FIG. 12). In the illustrated embodiment, the distance $p$, or the pitch between the reflector elements, is less than the diameter $d$ of the reflector elements. Flat areas 122 (FIGS 11 and 13) parallel to the central plane 114 are formed on the surface of the reflective wall, the flat areas 122 each being enclosed by a group of three spherical reflector elements 116.

The inner, light reflecting surface 120 of the reflective wall 10 is coated with light reflective material 124. The coating can take place by vacuum metalizing the surface 120 with aluminum or the like in a manner well known in the art.

In the illustrated embodiment, the thickness $t$ (FIG. 12) between the flat areas 122 is one-half the diameter $d$ of the reflector elements 116.

Any incident light ray 174 striking the light receiving surface 118 along a radius of a spherical reflector element 116 will pass through the center of the reflector element and will strike the inner, light reflecting surface 120. The light passing through the center will be reflected along the same line. Any light ray that enters a reflector element 116 along a path other than a radius will be refracted and will be reflected along a path non-parallel to the incident light.

In summary, FIGS. 7 through 10 of the drawings illustrate the invention embodied in a pavement marker having a housing 43 with a base 45 for engagement with the surface of a roadway and a reflective wall 48 for reflecting light from vehicles on the roadway. In use, the fore-and-aft axis 50 of the housing 43 is disposed in parallel relationship with the direction of travel of vehicles on the roadway. The axis 50 intersects the reflective wall 48 at a right angle. The reflective wall 48 has an inner surface and an outer surface, the outer surface 52, 54 extending at an acute angle $w$ with respect to the plane of the base 45. A plurality of conical reflector elements 58 are formed on the inner surface and have relatively high optical efficiency for reflecting incident light rays 64 that are substantially in a horizontal plane parallel to the plane of the base 45 and that are substantially parallel to the fore-and-aft axis 50. The conical reflector elements 58 have relatively low optical efficiency for reflecting light rays making a substantial acute angle (i.e. 5° to 7° or more as illustrated in the graph of FIG. 4) with respect to the plane of the base 45 or the fore-and-aft axis 50 of the housing. A plurality of wide angle reflector elements 68 are formed on the inner surface of the reflective wall having less optical efficiency than the conical reflector elements 58 for reflecting light rays that are substantially in a horizontal plane parallel to the plane of the base and that are substantially parallel to the fore-and-aft axis 50, but have greater optical efficiency than the conical reflector elements for reflecting incident light rays that make a substantial acute entrance angle with the plane of the base or with the axis 50.

The conical reflector elements 58 each have an apex 59 located remotely from the outer surface 56 and an axis 60 passing through the apex. The axis 60 of each of the conical reflector elements 58 lies in a plane that is perpendicular to the plane of the base and is parallel to axis 50. Each axis 60 also makes an acute angle with respect to the normal 62 that corresponds to the angle of refraction of the material of the reflective wall 48 such that the reflector elements 58 are oriented to receive incident light refracted from the outer surface 56 to the reflector elements 58 and then reflect the light in a direction substantially parallel to the direction of the incident light rays 64.

In the preferred embodiment of FIGS. 7 – 10, the wide angle reflector elements on the side portions 54 of the reflective wall are cube corner reflector elements, each of the cube corner elements 68 having an apex 69 located remotely from the outer surface 66 of the respective side portion of the reflective wall 48. Each of the cube corner reflector elements 68 has an axis 70 passing through the apex 69, the axes 70 being parallel to each other and extending at an acute angle with respect to the normal 72 to the outer surface 66 of the respective side portion 54 such that the cube corner reflector elements 48 are oriented to receive refracted rays from incident light rays 74 and reflect the refracted light rays in a direction substantially parallel to the direction of the incident light rays 74.

In the modification shown in FIGS. 11 through 13, the wide angle reflector elements are of spherical configuration. The spherical reflector elements 116 have substantially uniform optical efficiency or reflective power for reflecting incident light rays from any angle wherein the light ray is refracted to pass through the center of the spherical elements. However, the reflective power of the spherical reflector element 116 is generally less than that of cube corner reflector elements.

While specific forms of the invention are illustrated in the accompanying drawings and described in the foregoing specification, it should be understood that the invention is not limited to the exact construction shown. Various alternatives in the construction and arrangement of parts, all falling within the scope and spirit of the invention, will be apparent to those skilled in the art.

The embodiments of the present invention in which an exclusive property or privilege is claimed are defined as follows:

1. A pavement marker comprising: a housing having a base for engagement with the surface of a roadway and a reflective wall for reflecting light from vehicles on the roadway; said reflective wall having a central portion extending transversely of the fore-and-aft axis of the housing for reflecting incident light rays generally parallel to said fore-and-aft axis, and a pair of side portions extending from opposite ends of said central portion; said central portion having an outer surface extending at an acute angle with respect to said base; said central portion having an inner surface formed with a plurality of central reflector elements, said central reflector elements each being of conical configuration and having an apex located remotely from said outer surface with a side wall of circular cross-section extending continuously from said apex to the inner surface of said central portion, the axis of each cone passing through the apex thereof lying in a plane that is perpendicular to the plane of said base and is parallel to the fore-and-aft axis of said housing, and the axis of each cone extending at an acute angle with respect to the normal to said outer face such that incident light rays on said outer face that are generally horizontal and parallel to said fore-and-aft will be reflected by said central reflector elements in a direction parallel to said incident light rays; and side reflecting means on said side portions of said reflective walls for reflecting incident light rays on said side portions that extend at an acute angle with respect to said fore-and-aft axis with the side reflective means on one of said side portions being operable to reflect incident light rays making an acute angle with said fore-and-aft axis on one side thereof and the side reflective means on the other of said side portions being operable to reflect incident light rays making an acute angle with said fore-and-aft axis on the other side thereof.

2. A pavement marker as claimed in claim 1 wherein the side walls of said conical reflector elements are concave.

3. A pavement marker as claimed in claim 1 wherein the side walls of said conical reflector elements are convex.

4. A pavement marker as claimed in claim 1 wherein said side portions each have an outer surface and an inner surface, said outer surface extending at an acute angle with respect to the plane of said base, said outer surface further extending rearwardly at an acute angle with respect to the outer surface of said central portion; said side reflective means comprising a plurality of cube corner reflector elements, each of said cube corner reflector elements have three surfaces arranged mutually at right angles and meeting at a common point remote from said outer surface to form an apex with each cube corner reflector element having an axis passing through the apex thereof, each cube corner axis lying in a plane that is perpendicular to the plane of said base and to the plane of said outer surface of the respective side portion, each cube corner axis further extending at an acute angle with respect to the normal to the outer surface of the respective side portion such that incident light rays on the outer surface of the respective side portion will be refracted to the cube corner reflector elements and will be reflected thereby in a direction generally parallel to the direction of the incident light rays.

5. A pavement marker as claimed in claim 1 wherein said side portions each have a central plane extending at an acute angle with respect to the plane of said base, and said side reflective means comprises a plurality of spherical reflector elements integrally formed on said side portion and arranged in side-by-side relationship, said spherical reflector elements each having its center located on said central plane with the portions of the spherical reflector elements projecting from one side of said central plane defining an outer light receiving surface of said side portion and the portions of the spherical reflector elements projecting from the other side of said central plane defining an inner light reflecting surface of said side portion.

6. A pavement marker as claimed in claim 5 wherein said spherical reflector elements are arranged in adjacent rows with the spherical reflector elements in each row being staggered with respect to the spherical reflector elements in any adjacent row such that the center of each spherical reflector element in one row is located mid-way between the centers of adjacent pairs of spherical reflector elements in adjacent rows.

7. The invention as defined in claim 6, wherein the distance between each adjacent pair of said spherical reflector elements is less than the respective diameters thereof.

8. The invention as defined in claim 6 wherein flat areas parallel to said central plane are formed on the surface of said respective side portions, said flat areas each being enclosed by a group of three spherical reflector elements.

9. A pavement marker comprising: a housing having a base for engagement with the surface of a roadway and a reflective wall for reflecting light from vehicles on the roadway, the fore-and-aft axis of the housing being disposed in parallel relationship with the direction of travel of vehicles on the roadway and intersecting the reflective wall at a right angle; said reflective wall having an inner surface and an outer surface, the outer surface extending at an acute angle with respect to the plane of said base; a plurality of conical reflector elements formed on said inner surface having relatively high optical efficiency for reflecting incident light rays on said outer face that are substantially in a horizontal plane parallel to the plane of said base and that are substantially parallel to said fore-and-aft axis, and having relatively low optical efficiency for reflecting light rays making a substantial acute angle with respect to the plane of the base or the fore-and-aft axis of the housing; said conical reflector elements each having an apex located remotely from said outer surface with a side wall of circular cross-section extending continuously from said apex to said inner surface with the axis of each conical reflector element passing through the apex thereof; a plurality of wide angle reflector elements on said inner surface of a configuration other than conical having less optical efficiency than said conical reflector elements for reflecting incident light rays on said outer face that are substantially in a horizontal plane parallel to said fore-and-aft axis, but having greater optical efficiency than said conical reflector elements for reflecting incident light rays on said outer surface that make a substantial acute angle with the plane of said base or the fore-and-aft axis of said housing; said conical reflector elements each having an apex located remotely from said outer surface and an axis passing through said apex any lying in a plane that is perpendicular to the plane of said base and parallel to the fore-and-aft axis of said housing, and the axis of each of said conical reflector elements extending at an acute angle with respect to the normal to said outer face such that said conical reflector elements are oriented to receive incident light refracted from said outer surface to the conical reflector elements and reflect the light in a direction substantially parallel to the direction of incidence.

10. A pavement marker as claimed in claim 9 wherein said wide angle reflector elements comprise cube corner reflector elements each having three surfaces arranged mutually at right angles and meeting at a common point remote from said outer surface to form an apex, said cube corner reflector elements each having an axis passing through the apex thereof, the axis of said cube corner reflector elements being parallel to each other and extending at an acute angle with respect to the normal to said outer surface such that said cube corner reflector elements are oriented to receive incident light refracted from said outer surface to said cube corner reflector elements and reflect the light in a direction substantially parallel to the direction of incidence.

11. A pavement marker as claimed in claim 9 wherein said wide angle reflector elements comprise spherical reflector elements.

12. A pavement marker comprising: a housing having a base for engagement with the surface of a roadway and a reflective wall for reflecting light from vehicles on the roadway, the fore-and-aft axis of the housing being disposed in parallel relationship with the direction of travel of vehicles on the roadway and intersecting the reflective wall at a right angle, said reflective wall having a central portion and a pair of side portions extending from opposite ends of said central portion, said central portion having an inner surface and an outer surface, the outer surface extending at an acute angle with respect to the plane of said base, a plurality of conical reflective elements formed on the inner surface of said central portion having relatively high optical efficiency for reflecting incident light rays on said outer face that are substantially in a horizontal plane parallel to the plane of said base and that the substantially parallel to said fore-and-aft axis and having relatively low optical efficiency for reflecting incident light rays making a substantial acute angle with respect to the plane of said base or the fore-and-aft axis of said housing; said conical reflector elements each having an apex located remotely from said outer surface with a side wall of circular cross-section extending continuously from said apex to the inner surface of said inner surface of said central portion and an axis passing through said apex and lying in a plane that is perpendicular to the plane of said base and parallel to the fore-and-aft axis of said housing, and the axis of each of said conical reflector elements extending at an acute angle with respect to the normal to said outer face such that said conical reflector elements are oriented to receive incident light refracted from said outer surface to said conical reflector elements and reflect the light in a direction substantially parallel to the direction of incidence; and wide angle reflecting means on said side portions having less optical efficiency than said conical reflector elements for reflecting incident light rays on said outer face that are substantially in a horizontal plane parallel to the plane of said base and to said fore-and-aft axis, but having greater optical efficiency than said conical reflector elements for reflecting incident light rays making a substantial acute angle with the plane of said base or said fore-and-aft axis.

13. A pavement marker as claims in claim 12 wherein the side walls of said conical reflector elements are convex.

14. A pavement marker as claimed in claim 13 wherein the side walls of said conical reflector elements are convex.

15. A pavement marker comprising: a housing having a base for engagement with the surface of a roadway and a reflective wall for reflecting light from vehicles on the roadway, the fore-and-aft axis of the housing being disposed in parallel relationship with the direction of travel of vehicles on the roadway and intersecting the reflective wall at a right angle, said reflective wall having a central portion and a pair of side portions extending from opposite ends of said central portion, said reflective wall having a smooth outer surface and an inner surface, the outer surface extending at an acute angle with respect to the plane of said base, and the outer surfaces of said side portions extending rearwardly at an acute angle with respect to the outer surface of said central portion; a plurality of central reflector elements formed on the inner surface of said central portion having relatively high optical efficiency for reflecting incident light rays on said outer face that are substantially in a horizontal plane parallel to the plane of said base and that are substantially parallel to said fore-and-aft axis, and having relatively low optical efficiency for reflecting incident light rays making a substantial acute angle with respect to the plane of said base or the fore-and-aft axis of said housing; said central reflector elements each being of conical configuration, said conical reflector elements each having an apex located remotely from said outer surface and an axis passing through said apex and lying in a plane that is perpendicular to the plane of said base and parallel to the fore-and-aft axis of said housing, and the axis of each of said conical reflector elements extending at an acute angle with respect to the normal to said outer face such that said conical reflector elements are oriented to receive incident light refracted from said outer surface to said conical reflector elements and reflect the light in a direction substantially parallel to the direction of incidence; a plurality of wide angle reflector elements on the inner surfaces of said side portions having less optical efficiency than said central reflector elements for reflecting incident light rays on said outer face that are substantially in a horizontal plane parallel to the plane of said base and that are substantially parallel to said fore-and-aft axis, but having greater optical efficiency than said central reflector elements for reflecting incident light rays on said outer surface that make a substantial acute angle with the plane of said base or the fore-and-aft axis of said housing; said wide angle reflector elements comprising cube corner reflector elements each having three surfaces arranged mutually at right angles and meeting at a common point remote from said outer surface to form an apex, said cube corner reflector elements each having an axis passing through the apex thereof, the axes of said cube corner reflector elements being parallel to each other and extending at an acute angle with respect to the normal to the respective outer surface of the respective side portion such that said cube corner reflector elements are oriented to receive incident light refracted from said last named outer surface to said cube corner reflector elements and reflect the light in a direction substantially parallel to the direction of incidence.

* * * * *